Patented July 31, 1934

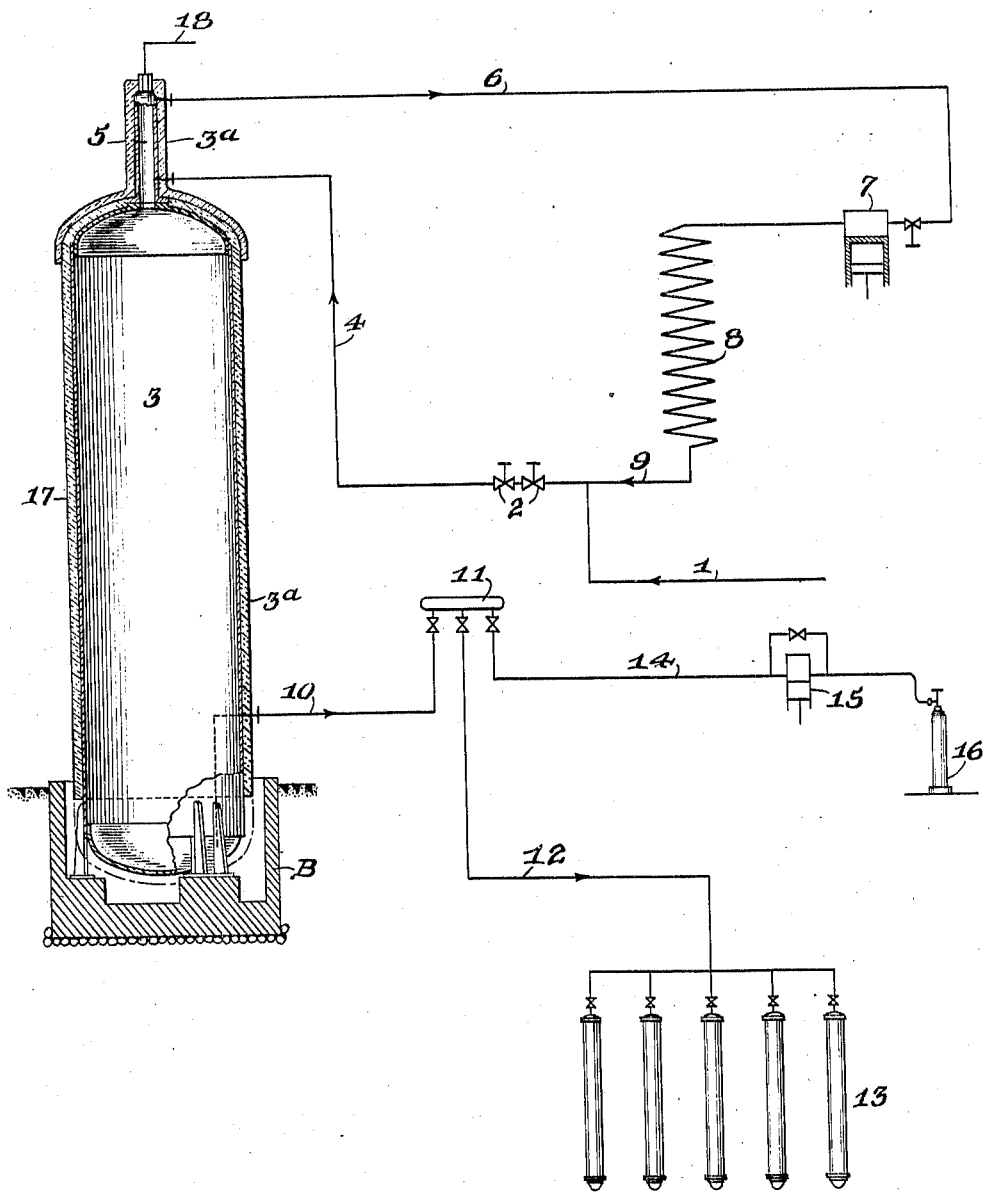

1,968,504

UNITED STATES PATENT OFFICE 1,968,504

PROCESS AND APPARATUS FOR STORING LIQUID CARBON DIOXIDE

Hans Rufener and Theophil Eichmann, Bern-Liebefeld, Switzerland, assignors to International Carbonic Engineering Company, Kennett Square, Pa., a corporation of Delaware Application December 6, 1933, Serial No. 701,244
In Switzerland May 29, 1933

9 Claims. (Cl. 62—170)

This invention relates to a process and apparatus for storing liquid carbon dioxide; and the nature and objects of the invention will be readily recognized and understood by those skilled in the arts involved in the light of the following explanation and detailed description of a preferred process and the steps thereof from among equivalent or other steps within the scope of the invention, and of the description and explanation of the accompanying drawing illustrating what is at present considered to be a preferred embodiment of an apparatus for carrying out a process of the invention, from among various other forms, arrangements, combinations and constructions of apparatus of which the invention is capable within the spirit and the scope thereof.

The invention is primarily directed to overcoming certain problems and difficulties encountered in attempts to store liquid carbon dioxide and maintain a reserve supply thereof available for use as may be required. Such a reserve supply of liquid carbon dioxide is especially desirable for plants or apparatus for solidifying carbon dioxide, and for liquefying and filling plants for charging the portable tanks or so called "bottles" that are in general commercial use, with liquid carbon dioxide. In the manufacture of solid carbon dioxide as a refrigerant, for example, the demands on the solidifying plant or apparatus are generally variable, depending upon the season of the year, so that during slack periods of demand, a plant has frequent periods of undercapacity operation, while during periods of peak demand, the plant operations are directly dependent on the rate of liquefaction of the carbon dioxide. Considerable economies and efficiencies, as well as increased rate of production can be obtained during periods of peak operations if reserve supplies of liquid are available on demand, and particularly if such reserve supplies can be produced and built-up by the plant during its slack periods of under-capacity operations.

Heretofore, attempts have been made to solve this problem of reserve supply of liquid carbon dioxide by storing and maintaining the liquid at normal temperatures. However, the pressure of the liquid carbon dioxide at normal temperatures lies between 60 and 80 atmospheres and necessitates the use of storage tanks or containers of such strength and weight to withstand these high pressures, that not only is the cost prohibitive, but the size and capacity of the tanks or containers is limited for practical reasons, and all of this aside from the dangers and risks attendant the storage at such extremely high pressures.

Where a storage tank or container is filled with liquid carbon dioxide at normal temperatures and pressures from 60 to 80 atmospheres, there is the great practical disadvantage, that the liquid cannot be completely removed as liquid from the tank or container. For instance, at a normal outside temperature of 20° C. only about 70% of the liquid carbon dioxide in a tank or container can be removed or withdrawn as a liquid, while at a normal temperature of about 30° C. only approximately 35 to 40% of the liquid contents can be withdrawn or removed as liquid. Hence, in order to store say 1000 kilos. of liquid carbon dioxide at normal temperatures as a reserve liquid supply, the storage would have to be made in a tank or container having a capacity of and filled to about 150% greater than if the storage of the liquid was carried out at temperatures below 0° C. Moreover, such a high pressure tank or container must provide an empty space therein for safety, of approximately 25 to 30% of its volume, due to the fact that liquid carbon dioxide when subjected to such high pressures will expand for every degree of rise in temperature.

However, if the storage of the liquid carbon dioxide be carried out at temperatures below —45° but above the triple point, with corresponding pressures, then considerable disadvantages and inefficiencies are met with. For instance at at a temperature of —50° C. and corresponding pressure, for a given weight of carbon dioxide vapor to be handled, that is, for a given amount of internal refrigeration that has to be done to maintain such storage temperature, a greater volume of gas has to be handled, resulting in certain compressor inconveniences, and inefficiencies. In order to practically and efficiently raise the pressures corresponding to —50° or lower, up to the original liquefaction pressures, at least two stages of compression must be utilized; while in storing liquid at —50° C. or lower, the insulation on the storage vessel must be greatly increased, or the heat loss will be seriously large.

A main object of the present invention is to reduce and substantially eliminate the foregoing difficulties and problems in the storage of liquid carbon dioxide, by the provision of a process, by which the liquid carbon dioxide can be efficiently, safely, and practically stored in relatively large quantities in tanks or containers at sufficiently low or reduced pressures to permit of comparatively light weight and reasonable cost tank, or container constructions, and under low temperatures to allow for practical and efficient tank or container heat insulation with a cold loss sufficiently small to permit of efficient storage over relatively long periods of time.

Another main and fundamental object and result of the invention resides in the process by which the liquid carbon dioxide is stored and maintained in storage under such conditions of pressure and temperature, that the stored liquid can be practically completely removed or withdrawn as a liquid from the storage tanks or containers.

A further object of the invention is the provision of such a process for storing liquid carbon dioxide, that is particularly adapted to utilization in cooperation with certain hereinafter referred to types of carbon dioxide solidifying methods and apparatus, in order to build up and maintain reserve supplies of liquid for such solidification.

Another object of the invention is to provide an efficient and practical form and arrangement of apparatus for carrying out and practicing the liquid storing process of the present invention.

With the foregoing objects and results in view, as well as certain others that will be readily understood and appreciated from the following detailed explanations, the invention consists in certain novel steps and procedure embodying the process, and in certain novel features in design and arrangement of elements forming the apparatus, all as will be more fully and particularly referred to and specified hereinafter.

The accompanying drawing is a diagrammatic view of apparatus capable of carrying out the process of the invention and operatively coupled with a carbon dioxide solidifying plant and with an apparatus for filling containers; the storage tank of the invention being shown more or less diagrammatically in vertical section.

A process of storing and maintaining a supply of liquid carbon dioxide in accordance with the invention, is fundamentally characterized by an adjustment downward or reduction in the pressure and temperature of the liquid prior to discharging the liquid into the storage tank or container. This temperature and pressure reduction is carried out to such a low degree that the specific volume of the vapor that will lie over the liquid in the storage tank will amount to many times the volume of the vapor that will lie over the liquid in a tank at normal temperatures and pressures. As illustrative of this characteristic, the vapor over liquid carbon dioxide in a container at −35° C., with corresponding pressure, has at least ten (10) times a greater volume than the vapor will have over the liquid at 30° C., with corresponding pressure.

So, following the first step of the basic process of the invention, the high pressure liquid carbon dioxide to be stored, has its temperature reduced to below 0° C. and also its pressure reduced, by continuous expansion of the high pressure liquid, prior to discharge of the liquid into a storage tank or container. The vapors formed during such expansion of the high pressure liquid are continuously drawn off and are preferably again compressed and liquefied for re-expansion for storage, as will be more fully referred to hereinafter. Preferably, the high pressure liquid is expanded down to temperatures ranging between −45° C. to −15° C., with corresponding pressures, and the liquid is discharged and stored in the storage tank or container under such a temperature and pressure range.

Referring here to the apparatus diagrammatically shown in the accompanying drawing, the high pressure liquid carbon dioxide is fed from any suitable or usual liquefaction source that includes the usual compressor and condensor (not shown), through the supply line or pipe 1, to the throttle or expansion valve 2, where the expansion of the liquid carbon dioxide is effected down to a pressure and temperature at which the specific volume of the vapor over the liquid is relatively very great, for example, a multiple of the volume of the vapor that will lie above liquid carbon dioxide at high pressures. From the expansion or pressure regulating valve 2, the liquid carbon dioxide reduced in pressure and in temperature flows, together with the throttle vapors formed in the valve 2, through the pipe or conduit 4, into the storage tank or container 3. Preferably, and as an example of an efficient storage temperature and pressure, the warm, high pressure liquid carbon dioxide is continuously expanded as it flows through valve 2, down to a pressure of approximately 13 to 15 atmospheres, and a temperature of from approximately −30° C. to −35° C.

The liquid storage tank or container 3 may be constructed of any usual or suitable material and is covered and enclosed by a suitable heat insulating material 3a. Due to the fact that the liquid carbon dioxide is stored in the tank 3 at materially reduced pressures over the normal temperature pressures of from 60 to 80 atmospheres, the weight and strength necessary for the tank places no practical size or cost limitations thereon, so that large tanks of considerable capacity are feasible. Further, because of the low temperature range of from −45° C. to −15° C., at which the liquid is stored, it is found practical and efficient to use thicknesses of the heat insulation material 3a for the tank, correspondingly ranging from 150 to 250 mm., without serious heat losses, due to transmission through such insulation.

The design and construction of the storage tank or vessel 3 of the invention provides the vertically disposed separating dome 5 at the upper end of the tank, and the liquid carbon dioxide pipe 4 from the expansion or throttle valve 2 discharges into the lower portion of this separating dome. From the upper end of the dome 5, a pipe or conduit 18 extends and has a weight or other suitable type of safety valve (not shown) therein for relieving the pressure in tank 3 in the event the pressure reaches a predetermined or danger pressure. The tank 3 is mounted and supported in vertical position by any suitable or desired supporting base structure B into which the lower end of the tank is received, although the present invention is not specifically concerned with any particular mounting arrangement for the storage tank.

The cold liquid carbon dioxide, cooled for example down to approximately −35° C. by expansion in valve 2, is discharged by pipe 4 into the separating dome 5 and drops to the bottom or lower end of tank 3, while the throttle vapors remain in the dome 5 and are drawn off therefrom through a pipe or conduit 6 at the upper end portion of the dome. The throttle vapor conduit 6 is connected to a suitable single stage compressor 7, which draws the vapors from the dome 5 and compresses them up to the liquefaction pressures, after which the vapors are again liquefied in the condenser 8 connected with the discharge or high pressure side of compressor 7. The reliquefied carbon dioxide from condenser 8, is conducted by pipe 9 together with the high pressure liquid from pipe 1, to the throttle valve 2, where the expansion with pressure and temperature reduction is continuously taking place during operation of the process.

The cold liquid carbon dioxide stored in the tank 1, is subjected to heat penetrating the tank insulation 3a, and heat which is thus transferred to the stored liquid will cause a slow increase in pressure within the tank 3, so that during storage from time to time, even though no additional liquid be introduced into the tank from valve 2, the evaporation vapors must be drawn off from the tank by the compressor 7. Thus, during the steps of filling the storage container and during the maintenance of the supply of stored liquid, the pressure within the storage tank is substantially maintained by the rate of withdrawal of the vapors from the tank, and the low temperature of the liquid preserved.

Withdrawal of the cold liquid from the storage tank 3 is had through the pipe or conduit 10 at the lower end of the tank. This pipe 10 leads to a collector or manifold 11 from which the liquid can be distributed to the desired points of use. For instance, in the example hereof, a pipe 12 carries cold liquid carbon dioxide from the collector 11, to a carbon dioxide solidifying plant 13 of the generator type in which solidification is carried out in accordance with the methods disclosed in the United States Patent 1,818,816, of August 11, 1931, to which patent reference may be had for a full disclosure of such methods. In the plant of the type of 13, the liquid carbon dioxide is expanded in the generators to approximately the triple point of carbon dioxide, so that the storage process of the present invention by which the liquid carbon dioxide is stored at pressures and temperatures above the triple point but below 0° C., lends itself especially to efficient use for storing reserve supplies of liquid that are to be employed in the solidification methods of the above referred to United States patent. However, the process and apparatus of the invention are not limited in their use to any particular solidification method or apparatus with which they are capable of functioning to supply liquid therefor.

Merely as an illustration of another use to which liquid stored by the process of the invention may be put, a pipe 14 leads from the collector 11, over a liquid pump 15, to supply liquid for the purpose of filling the standard or usual commercial portable tanks or so-called "bottles" in which liquid is stored and transported.

In practicing the process with the embodiment of apparatus shown, the storage tank 3 is filled with a supply of liquid carbon dioxide at a temperature in the range from −45° C. to −15° C., by continuously expanding a supply of high pressure liquid carbon dioxide in the valve 2 to the desired temperature and pressure, say a pressure of from 13 to 15 atmospheres and a temperature of from −35° C. to −30° C., and discharging such low temperature and reduced pressure liquid through pipe 4 into the separating dome 5 of the tank where the liquid drops down and collects in the tank. The throttle vapors separated out in dome 5 are continuously drawn off by compressor 7 at a rate to maintain the desired pressure and temperature conditions of the liquid in the storage tank, and are compressed and again liquefied by compressor 7 and condensor 8 for return to valve 2.

After the desired supply of cold liquid carbon dioxide is built-up in tank 3, the filling step is stopped and compressor 7 is operated only from time to time as necessary to draw off evaporation vapors and maintain the desired approximate pressure and temperature conditions. The cold liquid can be maintained over long periods of time as a reserve supply, and is withdrawn as needed through pipe 10 at the lower end of the tank. Due to the pressure and temperature conditions with the resultant specific volume of the vapor over the liquid in the tank, it is possible to withdraw substantially all of the liquid from the tank with the resultant material gain in efficiency of operation and use of the storage process and apparatus of the invention.

The process of storing liquid carbon dioxide at the pressures and temperatures in accordance with the invention results in the advantages of being enabled to completely utilize the liquid content of a storage tank as liquid; the use of tanks having relatively small wall thicknesses with reduced weight and cost of construction, even with large size tanks; increased efficiency of and greater yield from solidifying plants due to the more efficient temperatures of the storage liquid delivered thereto; and the complete separation of foreign bodies such as oil and water from the liquid carbon dioxide as a result of the below 0° C. storage temperatures.

It is evident that various changes, modifications, eliminations, substitutions and additions might be resorted to in both the steps and procedure of the process and in the apparatus and its arrangement without departing from the spirit and scope of the invention, and hence, it is not desired or intended to limit the invention as to process or apparatus in all respects to the exact and specific disclosures hereof.

What we claim, is:—

1. In a process of storing liquid carbon dioxide in a storage container; expanding high pressure liquid carbon dioxide prior to its discharge into the container down to a pressure and temperature condition at which the vapor over the liquid in the container has a specific volume greater than the specific volume of the vapor that would be over the high pressure liquid carbon dioxide; and during discharge of such expanded liquid carbon dioxide into the storage container continuously withdrawing the vapors formed by the expansion from the storage container to maintain the temperature and pressure conditions on the liquid in the container.

2. Apparatus for storing and maintaining a supply of liquid carbon dioxide in storage at a pressure above the triple point pressure, including a heat insulated storage container, a supply line for receiving high pressure liquid carbon dioxide, said supply line extending to and discharging into the upper part of the container, an expansion valve in said line for reducing the pressure and temperature of the liquid prior to discharge into the container, and a single stage compressor having its suction intake connected with the upper part of the storage container above said liquid supply line discharge into the container, said compressor withdrawing the expansion vapors from the container to maintain a predetermined pressure condition in the container.

3. Apparatus for storing and maintaining a supply of liquid carbon dioxide in storage at a pressure above the triple point pressure, including a heat insulated storage container, a supply line for receiving high pressure liquid carbon dioxide, said supply line extending to the upper part of the container, an expansion valve in said liquid supply line for reducing the pressure and lowering the temperature of the liquid prior to its discharge into the storage container, a single stage compressor having its suction intake connected with the upper part of the container above the point of liquid discharge to the container, said compressor withdrawing the expansion vapors from the container to maintain a predetermined liquid pressure in the container and compressing the withdrawn vapors to a liquefaction pressure, a condensor coupled with the compressor for liquefying the compressed vapors, a liquid line from the condensor to and discharging into the high pressure liquid supply line in advance of the pressure reducing expansion valve therein, and a stored liquid off-take line from the lower part of the storage container for withdrawing liquid therefrom.

4. Apparatus for storing and maintaining a supply of liquid carbon dioxide in storage at a pressure above the triple point pressure, including a heat insulated storage container having a separating dome at its upper end, a supply line for receiving high pressure liquid carbon dioxide, said supply line extending to and discharging into the lower part of said separating dome, an expansion valve in said supply line for reducing the pressure of the liquid prior to discharge into the container, and a compressor having its suction intake connected to the upper part of said separating dome for withdrawing expansion vapors from the container and dome to maintain a predetermined pressure on the liquid in the storage container.

5. A process of storing and maintaining a supply of liquid carbon dioxide that consists in; reducing the pressure of high pressure liquid carbon dioxide to a point where the temperature of the liquid is below 0° C., but above —45° C., storing such cold liquid in a storage container, and then maintaining substantially the pressure and temperature of the stored liquid during storage by withdrawing from the container from time to time, the evaporation vapors caused by temperature rises in the stored liquid.

6. A process of storing liquid carbon dioxide in a storage container, including the steps of: reducing the pressure of high pressure liquid carbon dioxide to a pressure at which the temperature of the liquid is below 0° C. but above the triple point temperature; storing such reduced pressure and temperature liquid in a suitable storage container; and then maintaining the pressure of the liquid in the container during storage at a pressure at which the temperature of the liquid is between the triple point temperature and 0° C. by withdrawing from the container the evaporation vapors caused by heat transfer to the liquid in the container.

7. A process of storing liquid carbon dioxide in a storage container, including the steps of: reducing the pressure of high pressure liquid carbon dioxide to a pressure at which the temperature of the liquid is reduced below 0° C. but is above the triple point temperature; storing a supply of such reduced pressure and temperature liquid in a storage container; then maintaining the pressure of the liquid during the storage period to hold the temperature thereof within the aforesaid temperature range, by withdrawing from the container, as necessary, the evaporation vapors caused by heat transfer through the storage container to the liquid therein; and reliquefying such withdrawn vapors and, after reducing the pressure and temperature thereof, returning the liquid to the storage container.

8. In a process of storing liquid carbon dioxide in a storage container; expanding high pressure liquid carbon dioxide prior to its discharge into a storage container down to a temperature range of from approximately —45° C., to —15° C.; discharging the resultant cooled liquid and expansion vapors into the storage container and continuously withdrawing the expansion vapors from the storage container during discharge into the container at a rate to maintain the liquid in the container within such temperature range.

9. In a process of storing and maintaining a supply of liquid carbon dioxide in a storage container; expanding high pressure liquid carbon dioxide prior to its discharge into a storage container down to pressures at which the temperature of the carbon dioxide is from approximately —45° C. to —15° C.; discharging the cooled liquid and expansion vapors into the storage container; continuously withdrawing the expansion vapors from the storage container during discharge into the container at a rate to maintain the liquid supply in the container within the desired temperature range; and after discharge into the container, maintaining the liquid within the pressure and temperature range by withdrawing evaporation vapors therefrom as required from time to time.

HANS RUFENER.
THEOPHIL EICHMANN.